H. D. CHURCH.
MOTOR VEHICLE.
APPLICATION FILED DEC. 7, 1917.
1,418,360. Patented June 6, 1922.
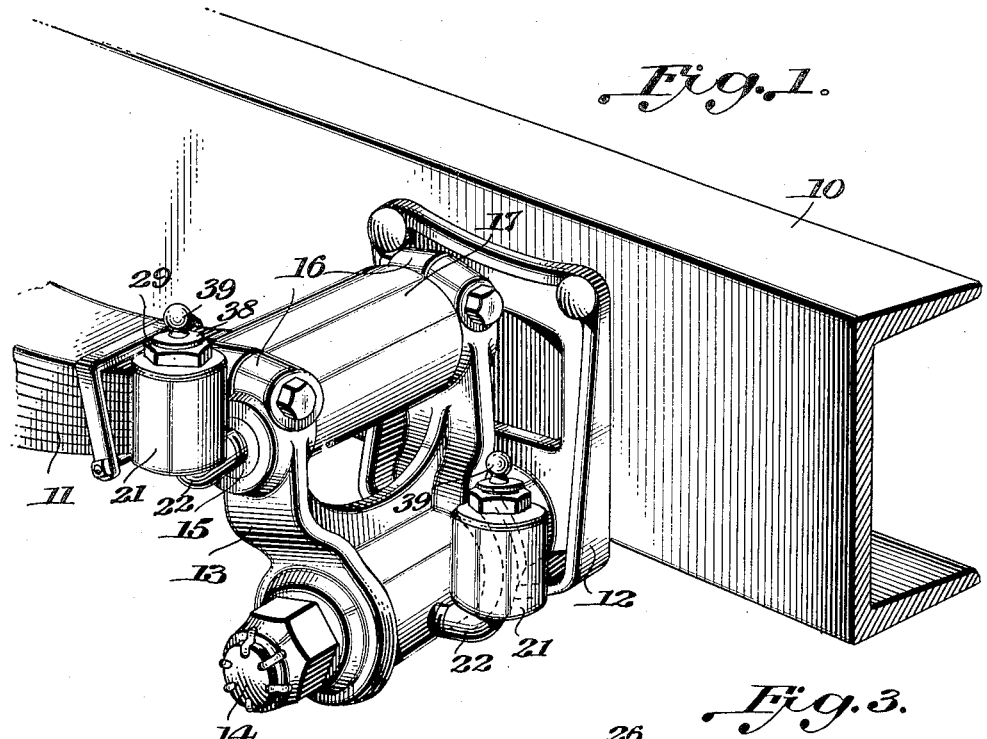
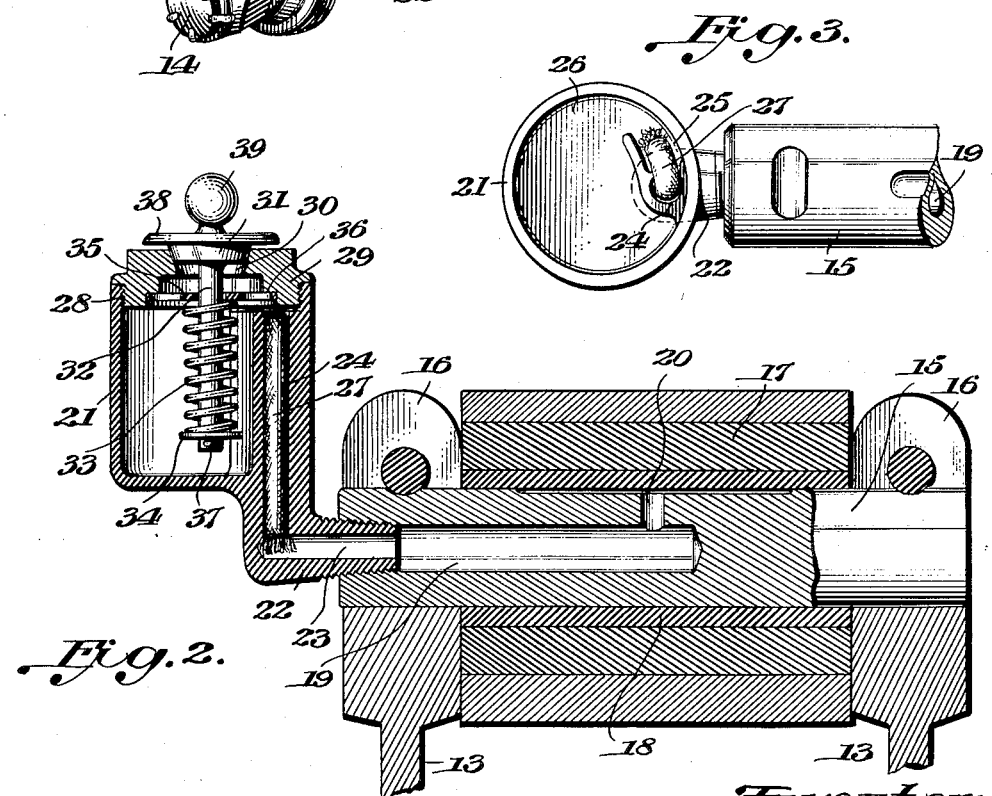
Inventor:
Harold D. Church,
By Milton Tibbetts, Atty.

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

1,418,360.      Specification of Letters Patent.      Patented June 6, 1922.

Application filed December 7, 1917. Serial No. 206,097.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles and particularly to oilers for the various moving parts thereof.

The invention is shown in the drawings as applied to the spring shackles of a motor vehicle. It may have other applications and is not limited to that particular use.

One of the objects of the invention is to provide an oiler which may be filled with oil at intervals but which will feed the oil from its reservoir to the part to be lubricated in small quantities but constantly.

Another object of the invention is to provide an oiler that is normally tightly closed and that may be filled by pushing the end of an oil can spout under its spring held cap.

Other objects of the invention will appear from the following description taken in connection with the drawings, which form a part of this specification, and in which:

Fig. 1 is a perspective view of a motor vehicle spring shackle and contiguous parts of the vehicle showing the application thereto of an oiler made in accordance with this invention;

Fig. 2 is an enlarged sectional view through one of the oilers shown in Fig. 1 and parts of the spring shackle; and Fig. 3 is a plan view of the oiler shown in Fig. 2, the cover having been removed.

Referring to the drawings, 10 represents one of the side members of a motor vehicle frame, 11 is one of the ends of a side spring and 12 is a spring bracket secured to the side of the frame member. A spring shackle 13 is pivotally supported upon a bolt 14 extending laterally from the bracket 12 and a bolt 15 is secured to the upper forked ends 16 of the shackle and passes through an eye 17 formed by the front end of the spring 11. In Fig. 2 it will be seen that two of the leaves of the spring 11 are bent around the bolt 15 to form the eye 17 and a bushing 18 is arranged between the bolt 15 and the spring eye for the purpose of taking the wear off of the spring.

The bolt 15 is preferably drilled out as at 19 and also has a lateral passage 20 through which lubricant may pass to the outer surface of the bolt 15 that is in contact with the bushing 18.

Threaded into the bolt 15 is an oiler 21 shown as having a substantially cylindrical body portion and a boss 22 at its lower end threaded into the bolt 15. The boss 22 is drilled out as at 23 and the body of the oiler is formed with two vertical channels 24 and 25, the channel 24 communicating with the interior 23 of the boss 22 and being open at its upper end to thereby communicate with the interior of the body of the oiler. The channel 25 is arranged alongside of the channel 24 and is formed by an extension or lip on the channel 24 and is open along its side and throughout its length as at 26, Fig. 3, so that oil in the body of the oiler flows freely into the channel 25.

These channels 24 and 25 extend approximately to the top of the body of the oiler and a wick 27 rests in the two channels, being bent at the top of the oiler and extending downwardly into both channels. Thus, the part of the wick that is in the channel 25 is immersed in the oil in the body of the oiler and is retained in the channel 25 by the projecting wall thereof. The other part of the wick extends downwardly into the interior of the boss 22 and thus slowly but constantly feeds oil from the body of the oiler to the boss 22 and into the drilled out part 19 of the bolt 15. The oil or lubricant then finds its way through the passage 20 to the bearing surface of the bolt 15.

The upper end of the body of the oiler is internally threaded as at 28 and a cover 29 is thereby removably secured over the top of the oiler. This cover has an opening formed with a tapered seat 30 and a valve 31 fits on said seat to thereby cover the opening. This valve has a stem 32 which extends downwardly into the body of the oiler and a spring 33 surrounds the stem of the valve and is arranged between a washer 34 at the lower end of the valve and a spider 35 seated on a shoulder 36 formed on the inside of the cover 29. The washer 34 is retained by a cotter pin 37 and the stem of the valve extends down through the spider 35 and is by the spring 33 yieldingly retained on the seat 30. By withdrawing the valve upwardly slightly the opening in the cover 29 is exposed and the oiler may be refilled. To facilitate withdrawal of the valve 31 it is formed with a flange 38 which is somewhat separated from the top of the cover 29 as will be seen in Fig. 2, so that the end of the spout of an oil can may be pushed under the flange to thereby raise the valve from its seat. The valve is also formed with a knob 39 by which it may be withdrawn by hand if desired.

It will be understood that my invention is not limited to the details of construction shown and other forms may be used without departing from the spirit or scope of the invention.

Having thus described my invention, what I claim and desire to secure by Letters Patent is:—

1. An oiler comprising a body having a receptacle for receiving oil, a channel located adjacent the wall of said body and having its upper end open and communicating with the interior of the body and having its lower end communicating with the part to be oiled, an apertured cap carried by said body and extending above said receptacle and channel, a closure member carried by said cap and adapted to close the aperture therein, resilient means carried by said closure member and extending into said receptacle for seating said closure member on said cap and a wick extending into said receptacle and said channel.

2. An oiler comprising a body, a cover detachably secured thereto, said cover having an opening forming a tapered seat, a valve adapted to fit said seat and having a flange separated from the top of the cover when the valve is on its seat, and spring means yieldingly holding the valve to its seat.

3. An oiler comprising a body, a cover detachably secured thereto, said cover having an opening therethrough, a valve to cover said opening and having a stem extending into the oiler, a spider seated in the cover and a spring extending between the end of the valve stem and said spider for yieldingly retaining the valve over said opening.

4. An oiler comprising a body having a receptacle for receiving oil, a channel adjacent the wall of said body and having its upper end open and communicating with the interior of the body and its lower end communicating with the part to be oiled, a wick extending into said channel and into said body and means for retaining the wick in position adjacent the wall of the body.

5. An oiler comprising a body having a receptacle for receiving oil, a channel adjacent the wall of said body and having its upper end open and communicating with the interior of the body and its lower end communcating with the part to be oiled, a wick extending into said channel and into said body and means formed on the channel for retaining the wick in position adjacent the wall of said body.

6. An oiler comprising a body having a receptacle for receiving oil, a channel adjacent the wall of said body and having its upper end open and communicating with the interior of the body and its lower end communicating with the part to be oiled, a wick extending into said channel and into said body and a lip formed on the channel for retaining the wick in position adjacent the wall of said body.

In testimony whereof I affix my signature.

HAROLD D. CHURCH.